No. 646,736. Patented Apr. 3, 1900.
T. HOLT.
EGG BEATER.
(Application filed Sept. 1, 1899.)
(No Model.)
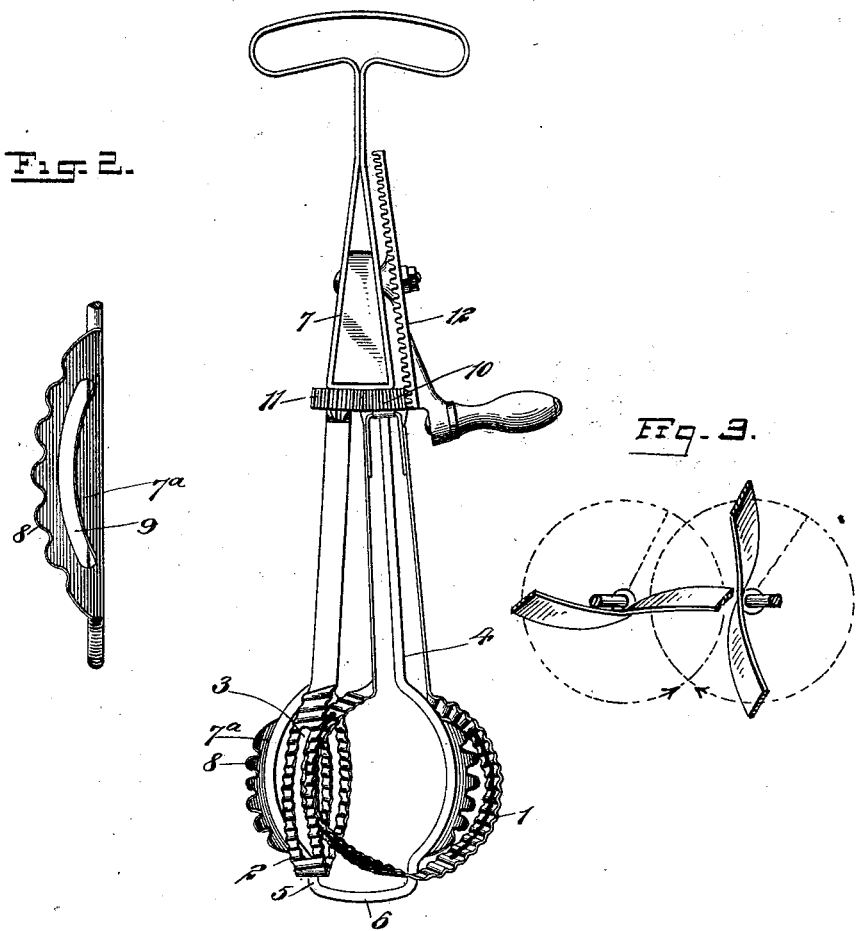

UNITED STATES PATENT OFFICE.

THOMAS HOLT, OF TARRYTOWN, NEW YORK.

EGG-BEATER.

SPECIFICATION forming part of Letters Patent No. 646,736, dated April 3, 1900.

Application filed September 1, 1899. Serial No. 729,233. (No model.)

*To all whom it may concern:*

Be it known that I, THOMAS HOLT, of Tarrytown, in the county of Westchester and State of New York, have invented a new and Improved Egg-Beater, of which the following is a full, clear, and exact description.

This invention relates to improvements in beaters for eggs, batter, cream, emulsion, or the like; and the object is to provide a beater of improved construction by means of which the material operated upon may be brought to its proper state or consistency in a comparatively short space of time.

I will describe an egg-beater embodying my invention and then point out the novel features in the appended claims.

Reference is to be had to the accompanying drawings, forming a part of this specification, in which similar characters of reference indicate corresponding parts in all the figures.

Figure 1 is an elevation of a beater embodying my invention. Fig. 2 is a detail showing a modification in the frame construction, and Fig. 3 is a sectional view showing the relative angles of the beater-blades.

The device comprises two beater-blades 1 2. These beater-blades each are of ring-like form, and for the purpose of getting a large beating-surface within a comparatively-small circumference the blades are transversely corrugated, as plainly indicated in the drawings. To more thoroughly draw the material operated upon toward the center and to more thoroughly break up lumps or globules, the opposite sides of the blades are provided with slots 3, which extend circumferentially. The blades are mounted to rotate on axial bars 4 5, which are connected together at the lower end at 6 and are connected at the upper end to a handle 7. These axial bars, with the handle therefor, form a frame for the whole device. The axial bars 4 and 5 are so spaced or related to each other that the blades will pass each other in rotating—that is, when the two blades are rotated one side of one blade will pass into the circle of the opposite blade. The opposite sides of each blade are so bent transversely as to stand at an angle to the longitudinal center of the blade, the angles of the two sides being in opposite directions. In other words, each beater-blade has its two opposite sides bent so as to stand neither radially to the center of motion nor yet at right angles to the radius, but at an angle between these two points, as indicated in Fig. 3, in which the plane of the blade from the bottom to the top crosses a circumferential path, (indicated by dotted lines,) with its outer end in advance or leading. By this construction the material operated upon is drawn toward the center.

Mounted on the frame or axial bars and adapted to be passed by the blades when rotating are outwardly-inclined guards $7^a$, which, as shown, are made with projecting teeth 8. The blades in passing these guards during their rotary motion will cause a certain amount of suction, which will draw air into the material being beaten, and I have found that the amount of air thus drawn in will be much greater than is possible when such guards are omitted, and it is well known that this aeration of the material will add materially to the bulk when finished. The guards are transversely curved, and their projection is circumferentially or around the axes of the beaters or blades, so that the blades will pass along the entire surface of the guards, and thus a greater suction will be produced.

In Fig. 2 I have shown the guard $7^a$ as provided with a longitudinal slot 9, which will allow a certain amount of material to pass through. The shank portions of the blades 1 2 are connected, respectively, to pinions 10 11, mounted to rotate on the bars 4 and 5 at the upper end. These pinions mesh together, and the pinion 10 meshes with a drive-wheel 12, mounted to rotate on the handle 7 and operated by a suitable crank.

Having thus fully described my invention, I claim as new and desire to secure by Letters Patent—

1. In a beater, a frame, two ring-like beaters mounted to rotate on the frame and so spaced that, when rotating, one side of a beater will pass into the circle of the other beater, each of said beaters being transversely corrugated and having opposite sides arranged at an inclination to the radial line, and guard-plates attached to the frame and having their inner surfaces curved axially of the beaters, substantially as specified.

2. In a beater the combination with a frame, of a beater-blade mounted to rotate on the frame, and a transversely-curved guard-plate attached to the frame, the said guard having projections or fingers along its edge, substantially as specified.

3. In a beater the combination with a frame, of a beater-blade of ring-like construction mounted to rotate on the frame, and transversely-curved guards on the frame adjacent to which the blades will pass when rotated, the said guards being slotted and having projections or fingers on the outer edge, substantially as specified.

THOMAS HOLT.

Witnesses:
 JNO. M. RITTER,
 C. R. FERGUSON.